United States Patent [19]

Lindsten

[11] Patent Number: 5,104,582
[45] Date of Patent: Apr. 14, 1992

[54] ELECTRICALLY CONDUCTIVE FLUIDS

[75] Inventor: Göran Lindsten, Mölndal, Sweden

[73] Assignee: SKF Nova AB, Gotenburg, Sweden

[21] Appl. No.: 420,283

[22] Filed: Oct. 12, 1989

[51] Int. Cl.$^5$ .......................... H01B 1/06; H01F 1/25
[52] U.S. Cl. .................................. 252/513; 252/518;
    252/519; 252/500; 252/62.31; 252/62.55;
    252/62.56; 252/62.62
[58] Field of Search ............... 252/500, 518, 519, 513,
    252/62.51, 62.55, 62.56, 62.61, 62.6, 62.62

[56] References Cited

U.S. PATENT DOCUMENTS 4,732,706  3/1988  Borduz et al. .................. 252/319
4,867,910  9/1989  Meguro et al. .................. 252/519

Primary Examiner—Josephine Barr
Attorney, Agent, or Firm—Eugene E. Renz, Jr.

[57] ABSTRACT

The invention refers to an electrically conducting, preferably magnetic fluid, which contains magnetic particles, dispersed in a carrier fluid by means of a dispersant. The fluid is characterized therein that it also contains an electrolyte, which is held in solution by means of one or more complex-forming substances known as ligands.

6 Claims, No Drawings

ELECTRICALLY CONDUCTIVE FLUIDS

FIELD OF THE INVENTION

The present invention relates to electrically conductive fluids, particularly magnetic fluids which have super paramagnetic properties.

BACKGROUND OF THE INVENTION

Super paramagnetic fluids have been known for sometime. Typically, these fluids contain finely divided magnetic particles which ar dispersed in oil by means of one or more dispersants. The oil or more generically, the carrier fluid maybe of varying types, as is the dispersement for the magnetic particles. Typically, the carrier fluid is colloidal oil.

Super paramagnetic fluids are introduced into and retained in spaces without mechanical restraint when a magnetic field is employed. This advantageous property has resulted in the use of super paramagnetic fluids as fluid seals having very low torque resistance. These seals do not generate particles during dynamic operation, in contrast to conventional lip seals. These fluid seals using super paramagnetic fluids have found extensive use as exclusion seals in disc devices for computers and as pressure seals in devices having a plurality of seals or stages. Super paramagnetic fluids are also used as heat transfer fluids between voice coils and magnetics in loud speakers. Examples of super magnetic fluids and the various compositions are described in U.S. Pat. Nos. 3,700,595; 3,764,540; 3,843,540; 3,917,538; 4,208,294; 4,285,801; 4,315,827; 4,333,988; and 4,701,276.

These magnetic fluids, particularly those described in the above referenced patents, are generally not electrically conductive. However, it is sometimes desirable that the fluids have a certain amount of conductivity. This is particularly important when the magnetic fluid is used as a seal. In many instances, it is highly desirable that static electricity be dissipated or removed from the apparatus being sealed. One method which has been provided to remove static electricity is the use of a knob which slides against the rotating shaft. Alternatively, the magnetic fluid may be made electrically conductive by addition of carbon particles, particularly in the form of graphite or by the use of an excess of cationic dispersant. These methods are described in European patent applications 208,391 and 206,516.

It is clear that there is a serious drawback in the use of an electrically conductive knob. Specifically, the knob causes friction, noise, and wear. Such knobs also require that there be more parts to assemble, thereby resulting in a complex and expensive seal.

The other alternative, the use of graphite in the magnetic colloid, may be given the desired electrical conductivity. However, it simultaneously increases the viscosity and adversely impacts on the physical properties of the colloid in other ways. An excess amount of dispersement also results in an increase of viscosity. Simultaneously, it reduces the surface tension and, if it is either acidic or alkaline, result in corrosion of the materials surrounding the solution.

SUMMARY OF THE INVENTION

It has now been discovered that the above and other problems associated with presently magnetic fluids and other electrically nonconductive fluids which incorporate sliding knobs, graphite, or dispersants in excess can be obviated. The present invention provides a fluid without the above mentioned drawbacks. It provides a fluid in which the electrical conductivity may be varied or altered over a wide range.

Specifically, an electrically conductive magnetic fluid has been discovered which contains magnetic particles dispersed with the use of a dispersant in a carrier fluid. The invention includes the use of an electrolyte which is kept in solution using one or more complex forming materials which are known as ligands.

It has been discovered that by varying the concentration and the composition of the complex and the relationship between the various components present in the fluid, it is possible to obtain a desired electrical conductivity. A wide variety of electrolytes are suitable for use in the present invention. In all cases, it is necessary that the material be compatible. Preferred electrolytes are derived from salts which has cations from alkali metals such as lithium, sodium, potassium, rubidium, and cesium. Also, ammonium cations may be used. The anion of the salt may be chloride, fluoride, bromide, hexafluorophosphide, picrate, thiocyanide, tetrafluboride, tetraphenylborate and toluol-4-sulfonate. Also, alkaline earth metals may be employed as electrolytes.

The ligand functions to complex or bind with the positive ion. Accordingly, the ligand should be soluble in the carrier fluid and have the property of being able to form a complex with the positive ion selected. Preferably, the ligand itself should be non-ionic. Suitable ligands which are preferred in the present invention are crown ethers, polyethylene glycol dialkyl ethers, polyethylene glycol fatty acid esters and bis (polyethylene glycol) esters from di-acids.

DETAILED DESCRIPTION OF THE PREFERRED EMBODIMENT

As has been described above, the present invention comprises the addition of an electrolyte and a ligand to a fluid to render the fluid electrically conductive. Typically, the invention is used with magnetic fluids such as those incorporated magnetic particles dispersed in a carrier fluid with a dispersant. Any of the known super paramagnetic colloids and other electrically nonconductive fluids can be made electrically conductive with aid of the additives of the present invention. Among those colloids which are admirably suited for use in the present invention are those described in U.S. patent application Ser. No. 246,481, filed ON Step. 21, 1989, having the title SUPER PARAMAGNETIC LIQUIDS AND METHODS OF MAKING SUPER PARAMAGNETIC LIQUIDS. In this patent application, the disclosure of which is incorporated herein by reference, a super paramagnetic fluid is described which contains a carrier fluid. The carrier may be an ester, ether, ketone, poly(alpha-olefin oil), mineral oil, triesters from trimethylol propane, mixed alkyltrimellitate-triesters, dialkyl sebacates or alkyl oleates.

The dispersant used in the colloids described in the above referenced and incorporated patent application is preferably selected from those having the formula A—X—B where A originates from a non-ionic surface active substance consisting of ethoyulated or propoxylated alcohols, ethoxylated or propoxylated or propoxylated amines and block polymers of ethylene oxide/propylene oxide, B is an organic carboxyl group, which binds said dispersant to the magnetic particles and X is a combining group, which combines A and B, whereby X incorporates at least one carbon atom.

The magnetic materials, which can be used in accordance with the invention, are known materials having a particle size from about 20 Angstrom to about 400 Angstrom in diameter. The most common materials are ferrites, such as magnetite ($Fe_3O_4$), zinc ferrite and manganese ferrite, metals such as iron, nickel or cobalt and chromium dioxide.

An order to demonstrate the effectiveness of the present invention, an umber of experiments were performed. A number of electrically conductive magnetic ductive through the use of an electrolyte and a ligand. The results of these tests are presented below at Table 1.

TABLE 1

| Basic Oil | Electrolyte | Ligand | Conductivity | Saturation magnetization |
|---|---|---|---|---|
| 1. Magnetic colloid* (20 ml) | $KPF_6$ (0.2 g) | Polyethylenglycol fatty acid ester (3 ml) | 4 nS/cm | 13.5 kA/m |
| 2. Magnetic colloid (15 ml) | $KPF_6$ (0.08 g) | Polyethylenglycol fatty acid ester (0.8 ml) | 3 nS/cm | 16.2 kA/m |
| 3. Magnetic colloid (14 ml) | $KPF_6$ (0.16 g) | Polyethlenglycol fatty acid ester (0.5 ml) | 5 nS/cm | 14.2 kA/m |
| 4. Magnetic colloid (5 ml) | $KPF_6$ (0.05 g) | Polyethlenglycol fatty acid ester (0.5 ml) | 5 nS/cm | 25.2 kA/m |
| 5. Magnetic colloid (5 ml) | $KPF_6$ (0.1 g) | Polyethlenglycol fatty acid ester (1.0 ml) | 6 nS/cm | 24.1 kA/m |

*This magnetic colloid was based on a triesteroil and the resulting mixture (colloid, salt and ligand) had a saturation magnetization of 13,5 kA/m, expressed in Si-units.
The conductivity has been expressed in nanosiemens per centimeter, nS/cm.

In order to further demonstrate the efficacy of the present invention, further experiments were carried out using the methods as described above. The results are presented below in Table 2. As can be seen, both magnetic and non-magnetic liquids are rendered conductive when the combination of an electrolyte and a ligand are both employed. Particularly, experiments 4, 6, 10, and 12 clearly demonstrate the significantly improved conductivity achieved by the present invention.

TABLE 2

| Carrier Liquid | Electrolyte | Ligand | Conductivity at 25° C. | Saturation magnetization |
|---|---|---|---|---|
| 1. Dichloromethane (50 ml) | — | — | 0.8 uS/cm | 0.0 kA/m |
| 2. Dichloromethane (50 ml) | — | Dibenzo-18-crown-6 (0.2 g) | 1.5 uS/cm | 0.0 kA/m |
| 3. Dichloromethane (50 ml) | KCl (0.04 g) | — | 0.8 uS/cm | 0.0 kA/m |
| 4. Dichloromethane (50 ml) | KCl (0.04 g) | Dibenzo-18-crown-6 (0.2 g) | 5.6 uS/cm | 0.0 kA/m |
| 5. Magnetic colloid/dichloromethane (50 ml) | — | — | 1.3 uS/cm | 26 kA/m |
| 6. Magnetic colloid/dichloromethane (50 ml) | KCl (0.04 g) | Dibenzo-18-crown-6 (0.2 g) | 6.2 uS/cm | 20 kA/m |
| 7. Triester oil (50 ml) | — | — | 0.0 nS/cm | 0.0 kA/m |
| 8. Triester oil (50 ml) | — | Polyethylene glycol fatty acid ester (7 ml) | 0.0 nS/cm | 0.0 kA/m |
| 9. Triester oil (50 ml) | KPF6 (0.5 g) | — | 0.0 nS/cm | 0.0 kA/m |
| 10. Triester oil (50 ml) | KPF6 (0.5 g) | Polyethylene glycol fatty acid ester (7 ml) | 3.6 nS/cm | 0.0 kA/m |
| 11. Magnetic colloid/triester oil (50 ml) | — | — | 0.5 nS/m | 20 kA/m |
| 12. Magnetic colloid/triester oil (50 ml) | KPF6 (0.5 g) | Polyethylene glycol fatty acid ester (7 ml) | 4.1 nS/cm | 20 kA/m | colloids were prepared and the conductivity was measured at a temperature of 25° C. in a measuring instrument named YEW, Conductivity Meter, Model SC 51. The resistance was measured in a special conductivity was determined on the basis of the measured resistance values. The conductivity was expressed in Siemens/cm = $(Ohm \times cm)^{-1}$. As electrolyte was used potassium hexafluorophosphate in different amounts and as ligand was used a polyethylene glycol-fatty acid ester having the trade name MAPEG 400 DL or MAPEG DO in different amounts. MAPEG is the trademark of Mazer Chemicals, Inc.

The electrolyte was first added to the ligand under stirring and was dissolved therein. Then the ligand solution was added to the magnetic colloid. Due to the altered composition of the colloid, some of the magnetic particles agglomerated. The resulting mixture was refined over a strong magnet for 24 hours and thereupon was filtered without the magnet being removed. Some particles which agglomerated and precipitated were removed during the filtration step. While the effective magnetic strength was somewhat decreased, the overall performance was not adversely affected.

Also, a number of other experiments were performed in which a carrier liquid was rendered electrically con- The present invention admirably suited for increasing the electric conductivity of fluids which are initially non-conductive. Depending upon the needs, the conductivity can be increased from as little as one nano Siemens (nS) per centimeter to as much as 1,000 nS/cm. A narrow range of preferred conductivity would be from about 1 to about 5 nS/cm.

The amount of electrolyte and ligand which are to be added to the fluid will vary depending upon the degree of conductivity and magnetic saturation desired. Typically, the amount of electrolyte will range from less than 0.01% by weight to more than 2% by weight. Similarly, the amount of ligand will vary from less than about 0.2% by volume to more than 20% by volume in order to accomplish the desired increase in conductivity.

What is claimed is:

1. An electrically conductive fluid comprising magnetic particles dispersed with a dispersant in a carrier fluid and also containing about 0.01% to about 2.0% by weight of an electrolyte held in solution by about 0.2% to about 20% by volume of a ligand which is soluble in a said carrier fluid, said electrolyte having a cation selected from the group consisting of lithium, sodium, potassium, rubidium, cesium and ammonium and an anion selected from the group consisting of chlorine, fluorine, bromine, hexafluorophosphate, picrate, thiocyanate, tetrafluoroborate, tetraphenolborate, and toluol-4-sulphonate.

2. The fluid of claim 1 wherein the ligand is non-ionic.

3. The fluid of claim 1 wherein the ligand is selected from the group of crown ethers, polyethylene glycol diakyl ethers, and bis (polyethylene-glycol) esters of diacids.

4. The fluid of claim 1 wherein the carrier fluid is selected from the group consisting of esters, ethers, ketones, poly(alpha olefin) oil and mineral oil.

5. The fluid of claim 1 wherein the carrier fluid is selected from the group consisting of alkanoic triesters of trimethylol propane, alkyltrimelliate-triesters, dialkyl sebacates, and alkyl oleates.

6. The fluid of claim 1 wherein the dispersant is an agent having the formula A—X—B, whereby A is a non-ionic surface active substance selected from the group consisting of ethoxylated or propoxylated alcohols, ethoxylated or propoxylated alkylphenols, ethoxylated or propoxylated amides, ethoxylated or propoxylated amines and block polymers of ethylene oxide/propylene oxide, B is an organic carboxyl group which binds said dispersant to the magnetic particles and X is a linking group covalently bonded to A and B and having at least one carbon atom.

* * * * *